United States Patent
Srinivasan et al.

(10) Patent No.: US 10,223,737 B2
(45) Date of Patent: Mar. 5, 2019

(54) AUTOMATIC PRODUCT MAPPING

(71) Applicant: Samsung Electronics Co., Ltd., Suwon-si, Gyeonggi-do (KR)

(72) Inventors: Vijay Srinivasan, San Jose, CA (US); Shalinder S. Sidhu, Saratoga, CA (US); Koichi Mori, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 14/981,508

(22) Filed: Dec. 28, 2015

(65) Prior Publication Data
US 2017/0186077 A1    Jun. 29, 2017

(51) Int. Cl.
*G06Q 30/00*    (2012.01)
*G06Q 30/06*    (2012.01)
*G06Q 50/00*    (2012.01)

(52) U.S. Cl.
CPC ......... *G06Q 30/0639* (2013.01); *G06Q 50/01* (2013.01)

(58) Field of Classification Search
CPC .................................................... G06Q 30/00
See application file for complete search history.

(56) References Cited

U.S. PATENT DOCUMENTS

| | | |
|---|---|---|
| 5,640,002 A | 6/1997 | Ruppert et al. |
| 7,309,009 B2 | 12/2007 | Singer-Harter |
| 8,396,758 B2 * | 3/2013 | Paradise ............... G06Q 30/02 705/26.1 |
| 8,401,771 B2 | 3/2013 | Krumm et al. |
| 8,521,180 B2 | 8/2013 | Parish |
| 8,566,014 B1 | 10/2013 | Kozolchyk et al. |
| 8,600,828 B2 | 12/2013 | Bonner et al. |
| 8,660,581 B2 | 2/2014 | Davis et al. |
| 8,775,260 B1 * | 7/2014 | Pienkos ............... G06Q 10/087 705/22 |

(Continued)

FOREIGN PATENT DOCUMENTS

| | | |
|---|---|---|
| JP | 2013-053930 | 3/2013 |
| KR | 10-2014-0102312 | 8/2014 |
| WO | 2013107669 A1 | 7/2013 |

OTHER PUBLICATIONS

Tode Chantal, "Retailers embrace in-store mapping via smartphones to facilitate shopping", Retaildive, dated May 15, 2013 (Year: 2013).*

(Continued)

*Primary Examiner* — Mark A Fadok
(74) *Attorney, Agent, or Firm* — Sherman IP LLP; Kenneth L. Sherman; Hemavathy Perumal

(57) ABSTRACT

A method comprising receiving different types of crowd-sourced information, the different types of crowd-sourced information relating to a physical store that a plurality of electronic devices have visited. The method further comprises determining a plurality of products available in the physical store based on the different types of crowd-sourced information, and correlating the different types of crowd-sourced information to determine at least one product location of at least one product of the plurality of products available. Each product location of each product identifies a location of the product within the physical store.

20 Claims, 11 Drawing Sheets

(56) References Cited

U.S. PATENT DOCUMENTS

| | | | |
|---|---|---|---|
| 8,983,865 B1* | 3/2015 | Murphy | G06Q 10/087 705/28 |
| 9,357,346 B2* | 5/2016 | Jagannath | H04W 4/021 |
| 9,418,352 B2* | 8/2016 | Lortz | G06Q 10/087 |
| 9,489,690 B1* | 11/2016 | Pienkos | G06Q 10/087 |
| 9,595,062 B2* | 3/2017 | Goulert | G06Q 30/0633 |
| 9,928,541 B2* | 3/2018 | Goulart | G06Q 30/0639 |
| 9,964,409 B1* | 5/2018 | Flint | G01C 21/206 |
| 2008/0077511 A1* | 3/2008 | Zimmerman | G06Q 10/00 705/28 |
| 2009/0012704 A1 | 1/2009 | Franco et al. | |
| 2009/0106037 A1* | 4/2009 | Harindranath | G06Q 30/06 705/342 |
| 2009/0121017 A1* | 5/2009 | Cato | G06Q 10/087 235/385 |
| 2009/0182499 A1 | 7/2009 | Bravo | |
| 2009/0192921 A1* | 7/2009 | Hicks | G06F 3/0312 705/28 |
| 2009/0231328 A1 | 9/2009 | Schwartz | |
| 2010/0017265 A1 | 1/2010 | Weingarten et al. | |
| 2010/0070365 A1* | 3/2010 | Siotia | G01C 21/20 705/14.49 |
| 2011/0029359 A1* | 2/2011 | Roeding | G06Q 30/00 705/14.1 |
| 2011/0161136 A1 | 6/2011 | Faith et al. | |
| 2012/0123673 A1 | 5/2012 | Perks et al. | |
| 2012/0123674 A1* | 5/2012 | Perks | G06Q 30/0631 701/426 |
| 2013/0036043 A1 | 2/2013 | Faith | |
| 2013/0073366 A1 | 3/2013 | Heath | |
| 2013/0150087 A1 | 6/2013 | Kosuru et al. | |
| 2013/0173435 A1* | 7/2013 | Cozad, Jr. | G06Q 10/087 705/28 |
| 2013/0218721 A1 | 8/2013 | Borhan et al. | |
| 2013/0282533 A1* | 10/2013 | Foran-Owens | G06Q 30/0641 705/27.1 |
| 2013/0300729 A1 | 11/2013 | Grimaud | |
| 2013/0346189 A1 | 12/2013 | Isaacs | |
| 2014/0003727 A1* | 1/2014 | Lortz | G06Q 10/087 382/218 |
| 2014/0018096 A1* | 1/2014 | Jagannath | H04W 4/021 455/456.1 |
| 2014/0095285 A1 | 4/2014 | Wadell et al. | |
| 2014/0129378 A1 | 5/2014 | Richardson | |
| 2014/0156346 A1 | 6/2014 | Cai | |
| 2014/0214547 A1 | 7/2014 | Signorelli et al. | |
| 2014/0278786 A1 | 9/2014 | Yan | |
| 2015/0006320 A1* | 1/2015 | Goulart | G06Q 30/0625 705/26.9 |
| 2015/0025950 A1 | 1/2015 | Yu | |
| 2015/0026010 A1 | 1/2015 | Ellison | |
| 2015/0039458 A1* | 2/2015 | Reid | G06K 9/00335 705/26.1 |
| 2015/0039461 A1 | 2/2015 | Gadre et al. | |
| 2015/0112826 A1 | 4/2015 | Crutchfield, Jr. | |
| 2015/0168538 A1 | 6/2015 | Bradley et al. | |
| 2015/0169597 A1* | 6/2015 | Edge | G06F 17/3087 707/751 |
| 2015/0262120 A1* | 9/2015 | Kulig | G06Q 10/087 705/28 |
| 2015/0262197 A1 | 9/2015 | Chao et al. | |
| 2015/0339761 A1* | 11/2015 | Pettyjohn | G06Q 30/0603 705/26.9 |
| 2015/0382153 A1* | 12/2015 | Otis | H04W 4/043 455/456.2 |
| 2016/0012489 A1* | 1/2016 | Rajan | G06Q 30/02 705/14.41 |
| 2016/0063529 A1* | 3/2016 | Roeding | G06Q 30/00 705/14.13 |
| 2016/0078484 A1* | 3/2016 | Emigh | G06Q 30/0211 705/14.58 |
| 2016/0189276 A1* | 6/2016 | Batra | G06Q 30/0633 705/26.8 |
| 2017/0048660 A1* | 2/2017 | Srinivasan | H04W 4/02 |

OTHER PUBLICATIONS

International Search Report and Written Opinion dated Sep. 30, 2016 for International Application No. PCT/KR2016/005884 from International Searching Authority, pp. 1-9, Korean Intellectual Property Office, Daejeon, Republic of Korea.

Anonymous, "Aisle411", Aug. 21, 2015, pp. 1-8, Wikipedia, United States [downloaded from https://en.wikipedia.org/wiki/Aisle411 and http://aisle411.com/ on Oct. 23, 2015].

Tamura, N., "Sugar: a SAT-based Constraint Solver", Feb. 6, 2015, pp. 1-7, Japan, [downloaded from http://bach.istc.kobe-u.ac.jp/sugar/ on Oct. 23, 2015].

Yokoo, M. et al., "Algorithms for Distributed Constraint Satisfaction: A Review", Autonomous Agents and Multi-Agent Systems, 2000, pp. 1-28, vol. 3, No. 2, United States.

Lee, Y-C. et al., "RSSI-based Fingerprint Map Building for Indoor Localization", 10th International Conference on Ubiquitous Robots and Ambient Intelligence (URAI), Oct. 30, 2013, pp. 292-293, IEEE, United States.

Kasantikul, K. et al., "An Enhanced Technique for Indoor Navigation System Based on WIFI-RSSI", 2015 Seventh International Conference on Ubiquitous and Future Networks, Jul. 7, 2015, pp. 513-518, IEEE United States.

Extended European Search Report dated Jul. 13, 2018 for European Application No. 16881899.5 from European Patent Office, pp. 1-8, Munich, Germany.

* cited by examiner

AUTOMATIC PRODUCT MAPPING

TECHNICAL FIELD

One or more embodiments relate generally to product mapping, and in particular, automatic product mapping at physical stores based on crowd-sourced data.

BACKGROUND

More than 70% of usage of retail-specific mobile applications are directed towards enhancing in-store experience of consumers (e.g., shoppers, patrons of stores, etc.). Presentation of products has been recognized as the focal point of the shopping experience. It is estimated that about 10% to 30% of consumers leave stores without purchasing one or more desired products because they cannot find the desired products, even though the desired products are available at the stores. To improve the likelihood a consumer making purchases during a visit to a store, mobile applications configured to dynamically provide targeted promotion and product information for desired products during the visit are desired. The product information for a desired product may include a location of the product within the store and/or real-time navigation of the consumer in regards to the desired product.

Typically, the average number of products available at a store is in the tens of thousands. Automatically creating a product map and dynamically providing product information to consumers removes the burden of manually creating a product map of a store and frequently updating the product map based on changes made by vendors to locations of products within the store.

SUMMARY

One embodiment provides a method comprising receiving different types of crowd-sourced information, the different types of crowd-sourced information relating to a physical store that a plurality of electronic devices have visited. The method further comprises determining a plurality of products available in the physical store based on the different types of crowd-sourced information, and correlating the different types of crowd-sourced information to determine at least one product location of at least one product of the plurality of products available. Each product location of each product identifies a location of the product within the physical store.

Another embodiment provides a system comprising at least one storage device, at least one processor and a non-transitory processor-readable memory device storing instructions that when executed by the at least one processor causes the at least one processor to perform operations. The operations include receiving different types of crowd-sourced information. The different types of crowd-sourced information relate to a physical store that a plurality of electronic devices have visited. The different types of crowd-sourced information are maintained on the at least one storage device. The operations further include determining a plurality of products available in the physical store based on the different types of crowd-sourced information. The different types of crowd-sourced information are correlated to determine at least one product location of at least one product of the plurality of products available. Each product location of each product identifies a location of the product within the physical store.

One embodiment provides a non-transitory computer readable storage medium including instructions to perform a method comprising receiving different types of crowd-sourced information. The different types of crowd-sourced information relate to a physical store that a plurality of electronic devices have visited. The different types of crowd-sourced information are maintained on the at least one storage device. The method further comprises determining a plurality of products available in the physical store based on the different types of crowd-sourced information. The different types of crowd-sourced information are correlated to determine at least one product location of at least one product of the plurality of products available. Each product location of each product identifies a location of the product within the physical store.

Another embodiment provides a method comprising, at an electronic device including at least one sensor device, capturing different types of information associated with a visit to a physical store. The method further comprises transmitting the different types of information to a server. The different types of information are correlated at the server to determine at least one product location of at least one product available at the physical store. The method further comprises receiving a product map for the physical store from the server. The product map identifies each product location determined.

These and other features, aspects and advantages of the one or more embodiments will become understood with reference to the following description, appended claims and accompanying figures.

DETAILED DESCRIPTION

Figure 1:
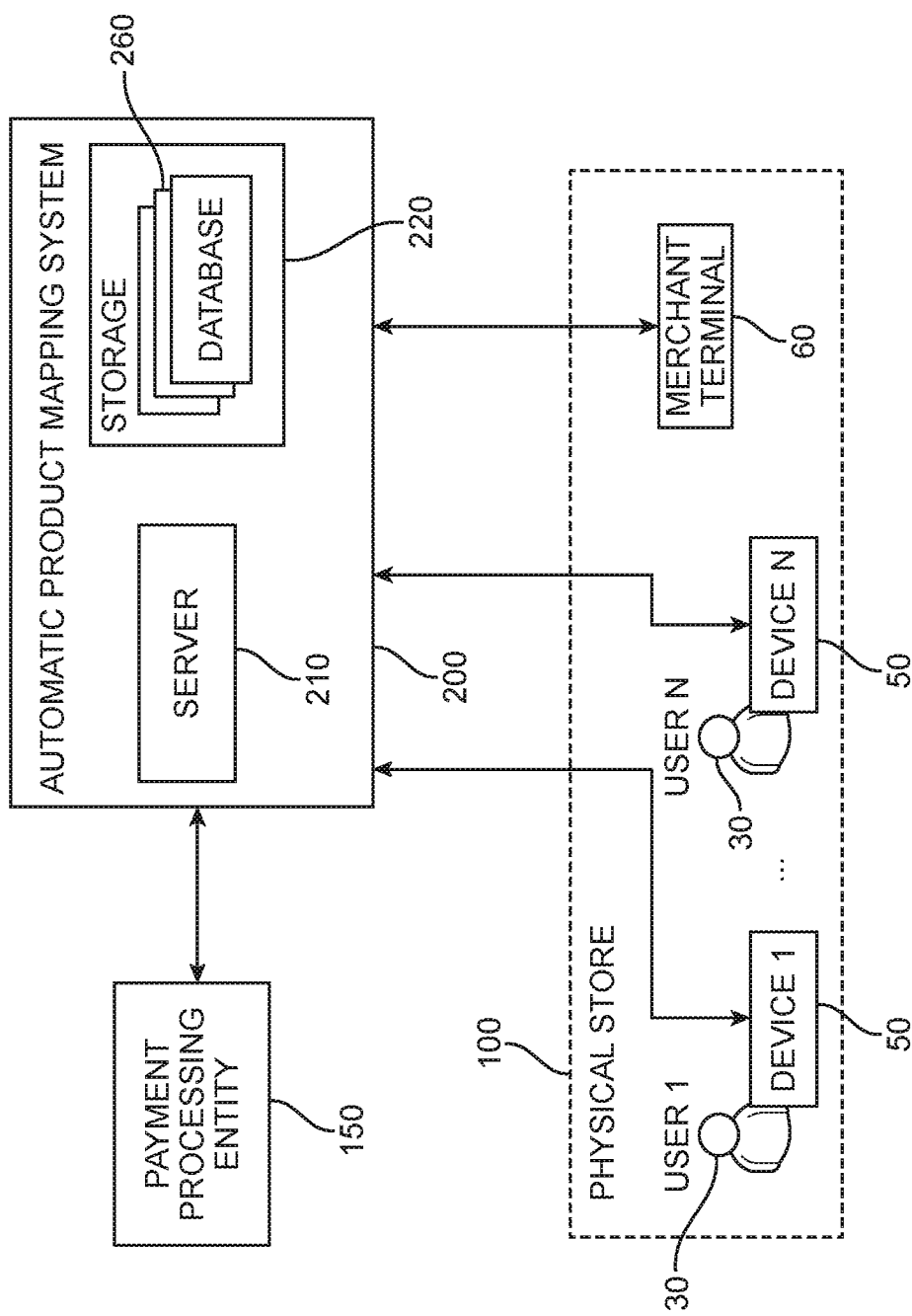
FIG. 1 illustrates an example automatic product mapping system, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Another embodiment provides a system comprising at least one storage device, at least one processor and a non-transitory processor-readable memory device storing instructions that when executed by the at least one processor causes the at least one processor to perform operations. The operations include receiving different types of crowd-sourced information. The different types of crowd-sourced information relate to a physical store that a plurality of electronic devices have visited. The different types of crowd-sourced information are maintained on the at least one storage device. The operations further include determining a plurality of products available in the physical store based on the different types of crowd-sourced information. The different types of crowd-sourced information are correlated to determine at least one product location of at least one product of the plurality of products available. Each product location of each product identifies a location of the product within the physical store.

One embodiment provides a non-transitory computer readable storage medium including instructions to perform a method comprising receiving different types of crowd-sourced information. The different types of crowd-sourced information relate to a physical store that a plurality of electronic devices have visited. The different types of crowd-sourced information are maintained on the at least one storage device. The method further comprises determining a plurality of products available in the physical store based on the different types of crowd-sourced information. The different types of crowd-sourced information are correlated to determine at least one product location of at least one product of the plurality of products available. Each product location of each product identifies a location of the product within the physical store.

Another embodiment provides a method comprising, at an electronic device including at least one sensor device, capturing different types of information associated with a visit to a physical store. The method further comprises transmitting the different types of information to a server. The different types of information are correlated at the server to determine at least one product location of at least one product available at the physical store. The method further comprises receiving a product map for the physical store from the server. The product map identifies each product location determined.

One or more embodiments relate generally to product mapping, and in particular, automatic product mapping at physical stores based on crowd-sourced data. One embodiment provides a method comprising receiving different types of crowd-sourced information, the different types of crowd-sourced information relating to a physical store that a plurality of electronic devices have visited. The method further comprises determining a plurality of products available in the physical store based on the different types of crowd-sourced information, and correlating the different types of crowd-sourced information to determine at least one product location of at least one product of the plurality of products available. Each product location of each product identifies a location of the product within the physical store.

For expository purposes, the term "physical store" as used herein refers to a place of business engaged in retailing/selling goods and/or services, such as a store, a mercantile establishment, an outlet, a warehouse, a department store, a shopping center, a strip mall, etc. The term "user" as used herein refers to a consumer or patron visiting a physical store, such as a shopper. The term "product category" as used herein refers to a particular type of product or a particular section of merchandise, such as food, appliances, etc. The term "product location" as used herein denotes a location of a product or product category available at a physical store.

FIG. 1 illustrates an example automatic product mapping system 200 in one or more embodiments. The system 200 comprises one or more server devices 210, and one or more storage devices 220. The one or more storage devices 220 may maintain one or more databases 260. As described in detail later herein, one or more applications may execute/operate on the one or more server devices 210 to facilitate automatic mapping of products available in physical stores.

One or more users 30 (e.g., User 1, . . . , User N) visiting a physical store 100 may carry on their person one or more electronic devices 50 (e.g., Device 1, . . . , Device N). For example, a user 30 visiting a physical store 100 may have a mobile smartphone and/or a wearable device such as a smartwatch. In one embodiment, each device 50 is configured to exchange data with the system 200 over a connection (e.g., a WiFi connection or a cellular data connection). As described in detail later herein, each device 50 is configured to forward different types of data to the system 200, such as location traces of a user 30 carrying the device 50 during a visit to a physical store 100, product buying behavior information associated with the user 30 during the visit, product search or scan behavior information associated with the user 30 during the visit, etc.

In one embodiment, a physical store 100 may include one or more merchant terminals 60 configured to process payments for purchases made at the physical store 100. In one embodiment, each merchant terminal 60 is configured to exchange data with the system 200 over a connection (e.g., a wireless connection, a wired connection, or a combination of the two).

In one embodiment, one or more payment processing entities 150 may be located remotely relative to the physical store 100 (e.g., a cloud-based payment processing facility). Each payment processing entity 150 is configured to process payments for purchases made at the physical store 100. In one embodiment, each payment processing entity 150 is configured to exchange data with the system 200 over a connection (e.g., a wireless connection, a wired connection, or a combination of the two).

Figure 2:
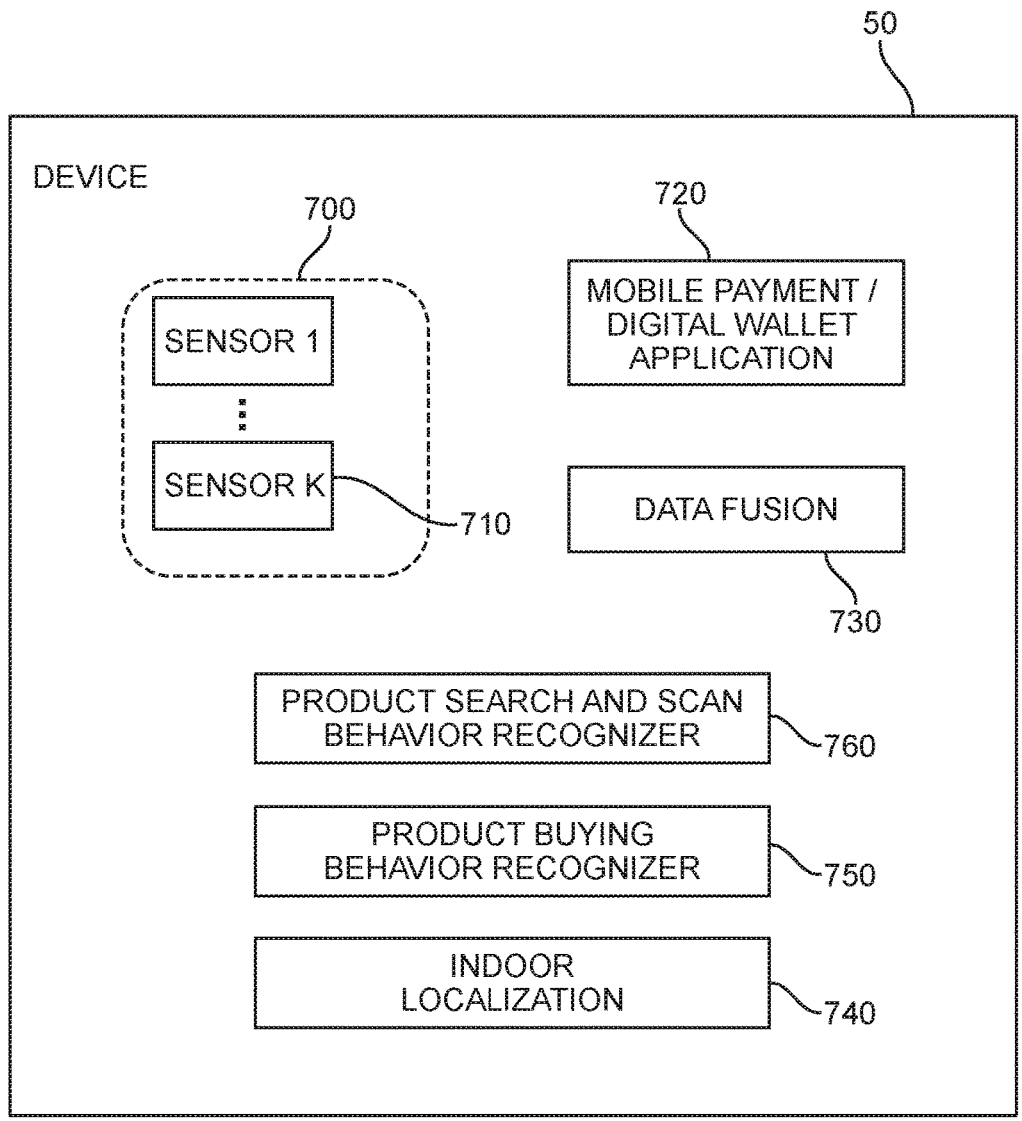
FIG. 2 illustrates an example device, in one or more embodiments.

FIG. 2 illustrates an example device 50, in one or more embodiments. The device 50 comprises a set 700 of sensors 710 (e.g., Sensor 1, . . . , Sensor K). Each sensor 710 is configured to capture a particular type of sensor data. For example, in one embodiment, the set 700 may include at least one hardware sensor and/or at least one software sensor. Examples of hardware sensors include an inertial sensor, a magnetic sensor, a barometer, a WiFi sensor, a Bluetooth sensor, a GPS sensor, a microphone, etc. Examples of software sensors include software applications configured to perform one or more of the following operations: logging search history (e.g., URLs visited) of online searches performed via the device 50, logging usage of other software applications residing on the device 50 (e.g., retail-specific mobile applications, mobile payment/digital wallet applications, product scanning mobile applications, etc.), logging browser history of a browser utilized on the device 50, etc.

For expository purposes, the term "sensor data" as used herein refers to one or more types of sensor data captured by the sensors 710.

In one embodiment, one or more mobile payment/digital wallet applications ("mobile payment app") 720 may reside on the device 50. Each mobile payment app 720 is configured to allow a user 30 to make electronic commerce transactions via the device 50, such as paying for one or more products available at a physical store 100.

The device 50 further comprises an indoor localization unit 740 configured to determine indoor locations utilizing available indoor localization techniques. As described in detail later herein, the indoor localization unit 740 may be utilized to perform localization during the entirety of a visit to a physical store 100 by a user 30 with the device 50. For example, based on a fingerprint map 550 (FIG. 8) from the system 200, the indoor localization unit 740 may be utilized to determine one or more in-store locations 320 (FIG. 4) based on sensor data captured by the sensors 710 during the visit. Each in-store location 320 identifies a particular location within the physical store 100 that the device 50 was located at during the visit. As described in detail later herein, in one embodiment, each in-store location 320 may be associated with one of a product buying behavior or a product search or scan behavior.

In one embodiment, Simultaneous Localization and Mapping (SLAM) techniques may be used to combine different types of sensor data captured by the sensors 710. For example, the in-store locations 320 may be determined using a particle filter algorithm to continuously fuse (i) noisy location values obtained from pedestrian dead reckoning based on accelerometer sensor data captured by an accelerometer, gyroscope sensor data captured by a gyroscope, and magnetic sensor data captured by a magnetic sensor, and (ii) distinct location signatures based on sensor data and radio signal strength data captured by the sensors 710. For example, a location signature may be ascertained based on one of the following: WiFi scans captured by a WiFi sensor, Bluetooth scans captured by a Bluetooth sensor, magnetic sensor data captured by a magnetic sensor, audio sensor data captured by a microphone, image sensor data captured by a camera, etc.

The indoor localization unit 740 is configured to provide, as output, a real-time location of the device 50. The real-time location of the user 30 may be represented using global three-dimensional (3D) coordinates (e.g., the 3D coordinates may comprise latitude, longitude, and floor number within the store).

In another embodiment, in-store locations 320 are determined remotely relative to the device 50. Specifically, the device 50 sends raw sensor data, including WiFi and/or Bluetooth scans, captured by the sensors 710 during the visit to the system 200. As described in detail later herein, the system 200 is configured to determine one or more in-store locations 320 based on the raw sensor data from the device 50.

The device 50 further comprises a product buying behavior recognizer unit 750 configured to perform buying behavior recognition during the entirety of the visit. Specifically, the product buying behavior recognizer unit 750 applies supervised machine learning, sensor-based feature extraction and/or signal processing techniques (e.g., dynamic time warping, support vector machines (SVMs) or Hidden Markov Models (HMMs)) to detect one or more product buying behaviors captured during the visit.

In one embodiment, a product buying behavior comprises one or more user gestures representing a selection of a product by the user 30 at the physical store 100; the user gestures are inferred based on sensor data captured by the sensors 710 during the visit. Examples of user gestures representing a selection of a product by the user 30 comprise at least one of the following: the user 30 walking towards and stopping within proximity of a display structure 310, the user 30 picking a product from a display structure 310, and the user 30 depositing/adding a product to a shopping basket, a shopping cart or another type of container suitable for maintaining products.

For expository purposes, the term "product buying behavior information" as used herein denotes information relating to one or more inferred product buying behaviors. The product buying behavior information may include, for each inferred product buying behavior, sensor data capturing inferred user gestures associated with the product buying behavior, and a timestamp indicating when the user gestures were captured.

Based on the product buying behavior information and the in-store locations 320 determined, the product buying behavior recognizer unit 750 is configured to provide, as output, potential product locations 501 (FIG. 4) for products available at the physical store 100, where each product location 501 identifies a location within the physical store 100 where a selection of a product by the user 30 was detected. In one embodiment, each product location may be represented as 3D coordinates. In another embodiment, each product location may be represented as a discrete zone within the physical store 100 (e.g., a particular area of the physical store 100 where products of a particular product category are located). Each product location for a product may further include coarse-grained information, such as height and/or orientation information identifying whether the product is placed on a display structure 310 above, at or below eye level, whether the product is located on the right-hand side or left-hand side of display structure 310, etc.

In one embodiment, the product buying behavior recognizer unit 750 is configured to infer user gestures, such as walking and stopping behavior, from sensor data and/or processed indoor location data captured by the device 50.

In one embodiment, utilizing supervised learning techniques such as SVM, the product buying behavior recognizer unit 750 infers walking and stopping behavior based on accelerometer sensor data captured by an accelerometer of the device 50. In one embodiment, the product buying behavior recognizer unit 750 infers orientation change based on gyroscope sensor data captured by a gyroscope of the device 50.

For example, based on inertial sensor data and orientation sensor data captured by sensors 710 of a mobile smartphone, the product buying behavior recognizer unit 750 recognizes user gestures such as walking and stopping behavior and an orientation change; the orientation change may be used to determine whether a product is located on a left-hand side or right-hand side of an aisle.

As another example, based on inertial sensor data and accelerometer data captured by sensors 710 of a smartwatch, the product buying behavior recognizer unit 750 recognizes gestures of a user such as picking up a product and adding the product to a shopping cart or shopping basket, and infers relative position of the product with respect to the user. For example, the relative position of the product may be height of a shelf ("shelf height") of the product with respect to the user, i.e., whether the shelf height is greater than user's height (i.e., the shelf is above the user's head), lower than the user's height, similar to user's height (i.e., the shelf is at eye-level of the user), etc.

In one embodiment, the product buying behavior recognizer unit 750 infers user gestures of picking up a product and adding the product to a shopping cart or shopping basket utilizing supervised learning techniques such as Dynamic Time Warping (DTW) to compare real-time sensor data with previously trained examples (obtained offline and/or through supervised learning) for such user gestures. Similarly, to determine shelf height of a product with respect to a user, the product buying behavior recognizer unit 750 uses DTW on training data from different users picking up products at different shelf heights to determine an appropriate shelf height of the product, wherein the appropriate shelf height is a shelf height with the lowest DTW distance.

In one embodiment, the product buying behavior recognizer unit 750 improves accuracy of product buying behavior of a user by fusing user gestures inferred from sensor data captured by different devices 50 carried by a user (e.g., a smartphone and a smartwatch). For example, in one example implementation, the product buying behavior recognizer unit 750 infers that a user has picked up a product and added the product to a shopping cart or shopping basket only if sensor data from the user's smartphone and sensor data from the user's smartwatch both indicate that the user has picked up the product with a particular degree of confidence.

In another embodiment, product buying behavior of a user is determined remotely relative to the device 50. Specifically, raw sensor data captured by one or more devices 50 carried by the user (e.g., a smartphone, smartwatch, etc.) is sent to the system 200. As described in detail later herein, the system 200 is configured to infer product buying behavior of the user based on the raw sensor data received from the one or more devices 50.

The device 50 further comprises a product search and scan behavior recognizer unit 760 configured to perform searching behavior recognition during the entirety of the visit. Specifically, the product search and scan behavior recognizer unit 760 is configured to determine one or more product search or scan behaviors captured during the visit.

In one embodiment, a product search behavior comprises one of the following: (1) using a product scanning mobile application on the device 50 to scan one of a product or a barcode for the product, and search for information relating to the product ("product scan"), or (2) using a browser, a retail-specific mobile application (e.g., Amazon app, Walmart app, etc.) or other software on the device 50 to search online information relating to a product ("product search").

For expository purposes, the term "product search and scan behavior information" as used herein denotes information relating to one or more inferred product search or scan behaviors. The product search and scan behavior information may include, for each inferred product search or scan behavior, product information (e.g., a specific product that was searched or scanned, a set of potential products, or a product category), and a timestamp indicating when the product search or product scan behavior was captured.

Based on the product search or scan behavior information and the in-store locations 320 determined, the product search and scan behavior recognizer unit 760 is configured to provide, as output, potential product locations 501 (FIG. 4) for products available at the physical store 100, where each potential product location 501 for each product identifies a location within the physical store 100 where a product search or product scan behavior was captured. In one embodiment, each product location may be represented as 3D coordinates. In another embodiment, each product location may be represented as a discrete zone within the physical store 100 (e.g., a particular area of the physical store 100 where products of a particular product category are located).

For example, if the user 30 browses a merchandise site or review site during the visit, a URL of the site is logged on the device 50, and the product search and scan behavior recognizer unit 760 loads and analyzes content from the URL to determine a product or product category related to the product search. The product search and scan behavior recognizer unit 760 may also load and analyze content from retail-specific mobile applications utilized during the visit. For example, a user may use a retail-specific mobile application ("app") such as the Amazon app to browse online for prices of a specific product. In one embodiment, the product search and scan behavior recognizer unit 760 is configured to obtain from one or more retail-specific mobile applications residing on the device 50 one or more logs of products that a user has browsed online for.

In one embodiment, a mobile payment app 720 residing on the device 50 may provide product payment information comprising a list of products that a user has paid for at a point of sale utilizing the mobile payment app 720.

The device 50 further comprises a data fusion unit 730. For each visit to a physical store 100, the data fusion unit 730 is configured to combine product search and scan behavior information, product payment information, product buying behavior information, and in-store locations 320 associated with the visit to generate a single tuple corresponding to the visit. Each tuple generated corresponding to each visit comprises: (1) product buying behavior information associated with the visit (e.g., a list of timestamps indicating when product buying behaviors such as product pick-ups were inferred during the visit, and associated orientation/shelf height information), (2) product search and scan behavior information associated with the visit (e.g., a list of products or product categories along with the corresponding timestamps indicating when product searches or scans were performed during the visit), (3) in-store locations 320 associated with the visit (e.g., a list of all in-store locations captured during the visit along with the corresponding timestamps indicating when the in-store locations 320 were captured), and (4) product payment information at a point of sale associated with the visit (e.g., a list of specific products purchased during the visit).

Power and resource overhead on a device 50 when capturing sensor data during a visit will likely be low as the capture of sensor data is automatically started only when a user 30 visits a physical store 100, and a user typically visits a store for a short duration and a limited number of times per week (e.g., once or twice). In one embodiment, the capture of sensor data by may be automatically started when the device 50 infers a transition between driving to a store and walking inside the store based on low power sensors such as an accelerometer. In one embodiment, the capture of sensor data may be automatically suspended to conserve power depending on user patterns. For example, the capture of sensor data may be automatically suspended during the day when a user is working in an office, or at night when the user is sleeping.

Figure 3:
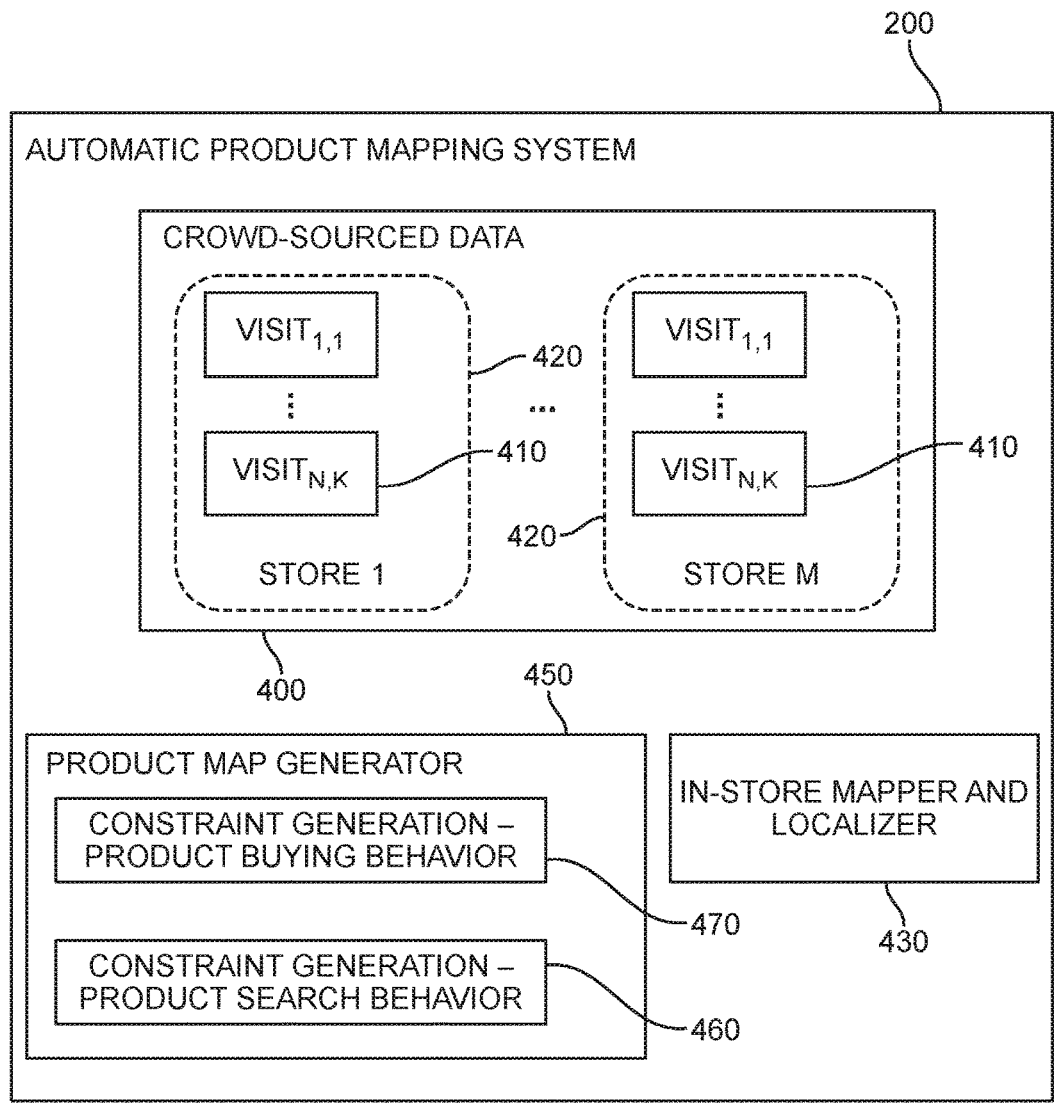
FIG. 3 illustrates an example automatic product mapping system, in one or more embodiments.

FIG. 3 illustrates an example automatic product mapping system 200, in one or more embodiments. As stated above, the storage devices 220 may maintain one or more databases 260. For example, the storage devices 220 may include a set 400 of databases 420 including data crowd-sourced from multiple devices 50 or multiple traces from a single device 50. In one embodiment, each database 420 corresponds to a particular physical store 100 (e.g., a first database 420 corresponding to STORE 1, . . . , an $M^{th}$ database 420 corresponding to STORE M). Each database 420 comprises at least one data record 410. Each data record 410 includes observed data from a visit to a corresponding physical store 100 by a user 30, the observed data captured by one or more devices 50 carried by the user 30, such as a smartphone and/or a smartwatch.

In one embodiment, each data record 410 comprises a tuple associated with a visit (e.g., a tuple generated by the data fusion unit 730). As described above, a tuple associated with a visit comprises: (1) product buying behavior information associated with the visit (e.g., a list of timestamps indicating when product buying behaviors such as product pick-ups were inferred during the visit, and associated orientation/shelf height information), (2) product search and scan behavior information associated with the visit (e.g., a list of products or product categories along with the corresponding timestamps indicating when product searches or scans were performed during the visit), (3) in-store locations 320 associated with the visit (e.g., a list of all in-store locations captured during the visit along with the corresponding timestamps indicating when the in-store locations 320 were captured), and (4) product payment information at a point of sale associated with the visit (e.g., a list of specific products purchased during the visit).

In another embodiment, the system 200 obtains product payment information associated with a visit from a payment processing entity 150 instead of a device 50. The system 200 may receive product payment information from a payment processing entity 150 over a network connection such as a wired or wireless network.

The system 200 further comprises an in-store mapper and localizer unit 430 configured to utilize available SLAM techniques to generate a physical indoor map of a physical store 100. For example, the in-store mapper and localizer unit 430 may utilize a particle filter algorithm to continuously fuse (i) noisy location traces from pedestrian dead reckoning based on accelerometer sensor data captured by an accelerometer, gyroscope sensor data captured by a gyroscope, and magnetic sensor data captured by a magnetic sensor, and (ii) distinct location signatures ascertained from signal strengths from WiFi and/or Bluetooth sensors along each location trace.

In one embodiment, the in-store mapper and localizer unit 430 is further configured to generate a radio fingerprint map that may be used to infer one or more in-store locations 320 within a physical store 100. The radio fingerprint map is provided to a device 50, and an indoor localization unit 740 of the device 50 performs localization based on the fingerprint map.

In another embodiment, the in-store mapper and localizer unit 430 is configured to receive raw sensor data, including WiFi and/or Bluetooth scans, from a device 50, and determine one or more in-store locations 320 based on the raw sensor data received from the device 50.

The system 200 further comprises a product map generator 450. For each physical store 100, the product map generator 450 is configured to combine crowd-sourced data maintained in a corresponding database 420, and determine one or more optimal product locations for one or more products available at the physical store 100. In one embodiment, the product map generator 450 formulates the determination of optimal product locations as a MAX Constraint Satisfaction Problem (CSP), utilizing existing CSP solvers to determine the optimal product locations.

Let $P=\{P_1, \ldots, P_n\}$ denote n input variables representing n discrete product locations for n products available at a physical store 100; the n discrete locations may be inferred from data crowd-sourced from multiple visits to the physical store 100 (e.g., crowd-sourced data maintained at a database corresponding to the physical store 100). Let D denote a domain comprising each discrete product location $P_i$ in the physical store 100. Let C denote a set of all constraints on product locations. Each constraint is generated based on data crowd-sourced from multiple visits to the physical store 100. Each visit to the physical store 100 generates one or more new constraints for a CSP solver, the constraints based on location trace information, product payment information at the point of sale, product buying behavior information inside the store, and/or product search/scan behavior information captured during the visit. The CSP solver determines and outputs optimal product location for the n products available at the physical store 100 by maximizing the number of constraints that are satisfied.

In one embodiment, the product map generator 450 comprises a first constraint generation unit 470 configured for generating one or more constraints based on the product payment information, the in-store location trace information and product buying behavior information captured by a device 50 during a visit to a physical store 100. Assume the product payment information includes a list of product identifiers $\{p_1, \ldots, p_k\}$ identifying products purchased during the visit, and the location trace information includes a list of in-store locations $\{l_1, \ldots, l_k\}$ identifying locations within the physical store 100 where product buying behaviors were captured during the visit. The first constraint generation unit 470 generates a constraint $(P_1, \ldots, P_k)=\{(l_1, \ldots, l_k), \ldots,\}$. Each constraint generated results in k! possible joint location assignments for k products purchased during the visit.

The product map generator 450 further comprises a second constraint generation unit 460 configured for generating one or more constraints based on location trace information and product search or scan behavior information captured by a device 50 during a visit to a physical store 100. Let $R_{scan}$ denote an uncertainty of an actual product location for a product with respect to one or more product scans for the product. The second constraint generation unit 460 generates the following constraint based on the products scans: a product $p_i$ is within a distance $R_{scan}$ of location $l_i$, where location $l_i$ denotes a location within the physical store 100 where product scans of the product $p_i$ were captured. Let $R_{search}$ denote an uncertainty of an actual product location for a product with respect to one or more product searches relating to the product. The second constraint generation unit 460 generates the following constraint based on the product searches: all products $p_k$ of a specific product category or model are within a distance $R_{search}$ where product searches of the products $p_k$ were performed.

Optionally, constraints may also be provided to a CSP solver based on known, typical layouts for physical stores 100 (e.g., milk products are likely to be close to one another, juice products are within proximity of milk products, etc.).

For each physical store 100, the product map generator 450 is further configured to automatically generate a product map 500 (FIG. 4) for the physical store 100. The product map 500 is a map illustrating one or more optimal product locations for one or more products available at the physical store 100. The product map 500 is automatically generated based on data crowd-sourced from multiple visits to the physical store 100 without requiring any manual user input. The product map 500 is sent to at least one device 50 (e.g., a device 50 frequenting the physical store 100).

Automatically generating a product map 500 for a physical store 100 removes the burden of manually creating a product map of the physical store 100. Further, the product map 500 removes the burden of having to manually update the physical map when product locations change (e.g., to improve product placement and increase revenue). As the product map 500 is generated offline on a server device 210 and not on a device 50, real-time response or resource efficiency are not critical constraints.

In one embodiment, data crowd-sourced from devices 50 and maintained on the databases 420 are anonymized to protect privacy and prevent tracking of in-store locations and payment details of any user 30. For example, all identifying information associated with a device 50 (e.g., a corresponding unique International Mobile Station Equipment Identity) are one-way hashed before sending to the system 200. Anonymizing data as described above reduces/removes the likelihood of an inference attack in which a third-party attacker may infer private user data from data associated with a visit to a physical store 100.

In one embodiment, frequently visited or purchased products available at a physical store 100 may be mapped within a short period of time; less frequently visited or purchased products may be mapped within a longer period of time.

Figure 8:
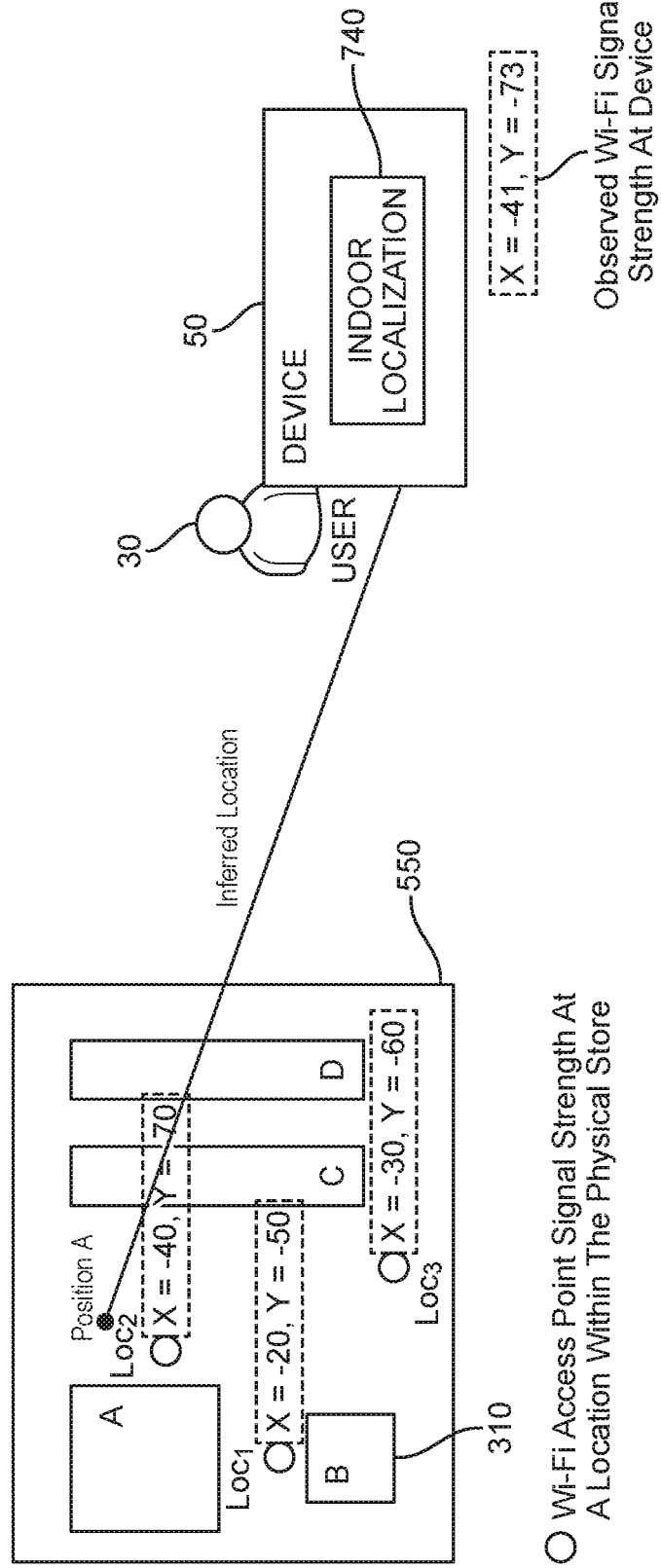
FIG. 8 illustrates an example fingerprint map for a physical store, in one or more embodiments.

In one embodiment, the in-store mapper and localizer unit 430 uses product locations 501 identified on a product map 500 for a physical store 100 as landmarks in building an accurate radio fingerprint map 550 (FIG. 8). The fingerprint map 550 is provided to a device 50, and an indoor localization unit 740 of the device 50 performs localization based on the fingerprint map 550 (i.e., localizing a user 30 of the device 50 in the physical store 100 with respect to products available at the physical store 100). Existing SLAM techniques are applied, wherein the product locations 501 are used as landmarks. The fingerprint map 550 comprises one or more a location signatures for one or more locations within the physical store 100. Each location signature may comprise a WiFi signal strength signature, a Bluetooth signal strength signature, and/or a magnetic sensor signature.

The system 200 provides the fingerprint map 550 and the product map 500 to the device 50. An indoor localization unit 740 of the device 50 is configured to determine, based on the fingerprint map, a real-time location of the user in the physical store 100 by comparing a current location signature with pre-existing location signatures for the store 100. Based on a real-time location of the user and the product map 500, the device 50 may provide navigation to one or more products desired by the user 30.

Automatically generating a fingerprint map 550 removes the burden of manually creating a fingerprint for each location in the physical store 100.

Figure 4:
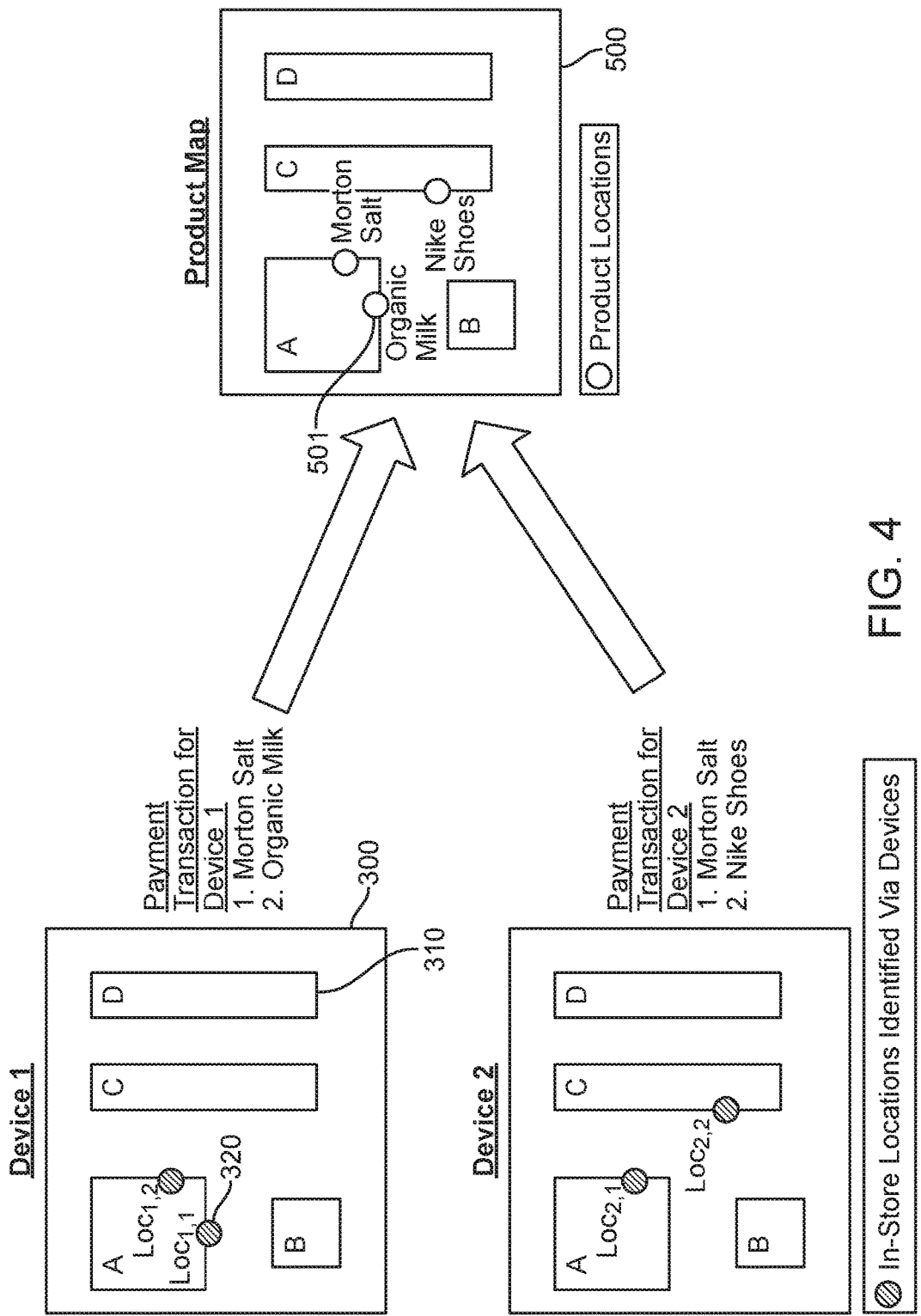
FIG. 4 illustrates an example product map based on location trace information, product payment information and product buying behavior information, in one or more embodiments.

FIG. 4 illustrates an example product map 500 based on location trace information, product payment information and product buying behavior information, in one or more embodiments. The product map 500 corresponds to a physical store 100 comprising multiple display structures 310, such as a first display structure 310 with reference label "A", a second display structure 310 with reference label "B", a third display structure 310 with reference label "C", and a fourth display structure 310 with reference label "D". The product map 500 illustrates multiple product locations 501 for multiple products available at the physical store 100, such as a first product location 501 located on the display structure A for Organic Milk, a second product location 501 located on the display structure A for Morton Salt, and a third product location 501 located on the display structure C for Nike Shoes.

The product locations 501 are determined based on location trace information, product payment information, and product buying behavior information crowd-sourced from one or more devices 50 that visit the physical store 100. For example, as shown in FIG. 4, the product locations 501 are determined based on the following: (1) location trace information, product buying behavior information and product payment information associated with a first visit to the physical store 100 by a first user 30 of a first device 50 with reference label Device 1, (2) location trace information, product buying behavior information and product payment information associated with a second visit to the physical store 100 by a second user 30 of a second device 50 with reference label Device 2. In-store locations 320 with reference labels $Loc_{1,1}$ and $Loc_{1,2}$, are identified by combining location trace information and product buying behavior information associated with the first visit. In-store locations 320 with reference labels $Loc_{2,1}$ and $Loc_{2,2}$ are identified by combining location trace information and product buying behavior information associated with the second visit. The product payment information associated with the first visit comprises payment transaction information identifying Morton Salt and Organic Milk as products purchased by the user 30 of the Device 1. The product payment information associated with the second visit comprises payment transaction information identifying Morton Salt and Nike Shoes as products purchased by the user 30 of the Device 2. The product map generator 450 of the system 200 is configured to correlate the in-store locations 320 with the products purchased to determine the product locations 501 for Morton Salt, Organic Milk and Nike Shoes (e.g., by formulating the determination of the product locations 501 as a MAX CSP).

Figure 5:
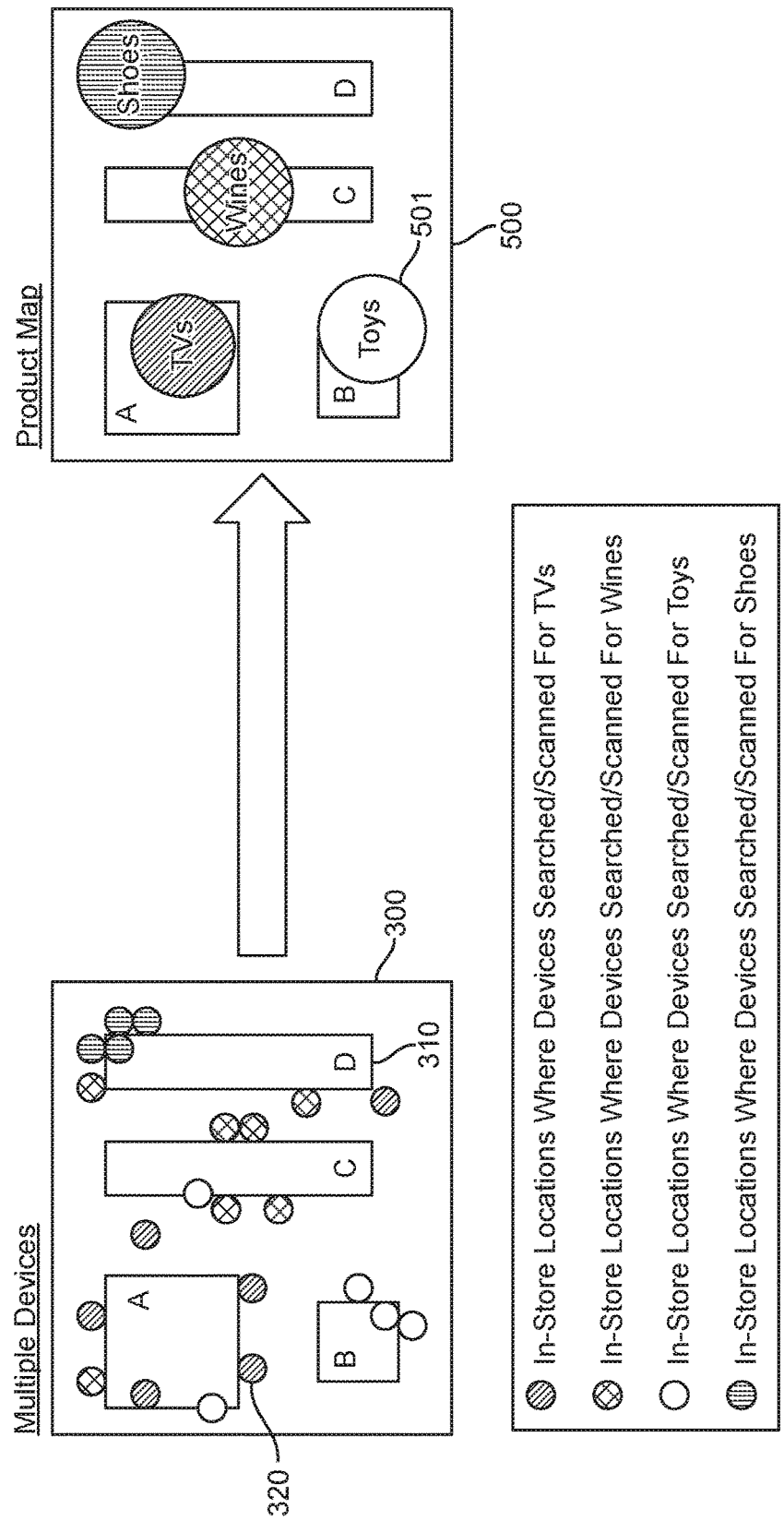
FIG. 5 illustrates an example product map based on location trace information and product search or scan behavior information, in one or more embodiments.

FIG. 5 illustrates an example product map 500 based on location trace information and product search or scan behavior information, in one or more embodiments. The product map 500 corresponds to a physical store 100 comprising multiple display structures 310, such as a first display structure 310 with reference label "A", a second display structure 310 with reference label "B", a third display structure 310 with reference label "C", and a fourth display structure 310 with reference label "D". The product map 500 illustrates multiple product locations 501 for multiple product categories available at the physical store 100, such as a first product location 501 located on the display structure A for televisions (TVs), a second product location 501 located on the display structure B for toys (Toys), a third product location 501 located on the display structure C for wines (Wines), and a fourth product location 501 located on the display structure D for shoes (Shoes).

The product locations 501 are determined based on location trace information and product search or scan behavior information crowd-sourced from one or more devices 50 that visit the physical store 100. For example, as shown in FIG. 5, the location trace information and product search or scan behavior information crowd-sourced include the following: (1) a first set of product searches or scans for TVs captured by the devices 50, (2) a first set of in-store locations 320 identifying locations within the physical store 100 where at least one product search or scan for TVs was captured, (3) a second set of product searches or scans for wines captured by the devices 50, (4) a second set of in-store locations 320 identifying locations within the physical store 100 where at least one product search or scan for wines was captured, (5) a third set of product searches or scans for toys captured by the devices 50, (6) a third set of in-store locations 320 identifying locations within the physical store 100 where at least one product search or scan for toys was captured, (7) a fourth set of product searches or scans for shoes captured by the devices 50, (8) a fourth set of in-store locations 320 identifying locations within the physical store 100 where at least one product search or scan for shoes was captured. The different sets of in-store locations 320 are correlated with the different sets of product searches or scans to determine the product locations 501 for TVs, wines, toys and shoes (e.g., by formulating the determination of the product locations 510 as a CSP).

Figure 6:
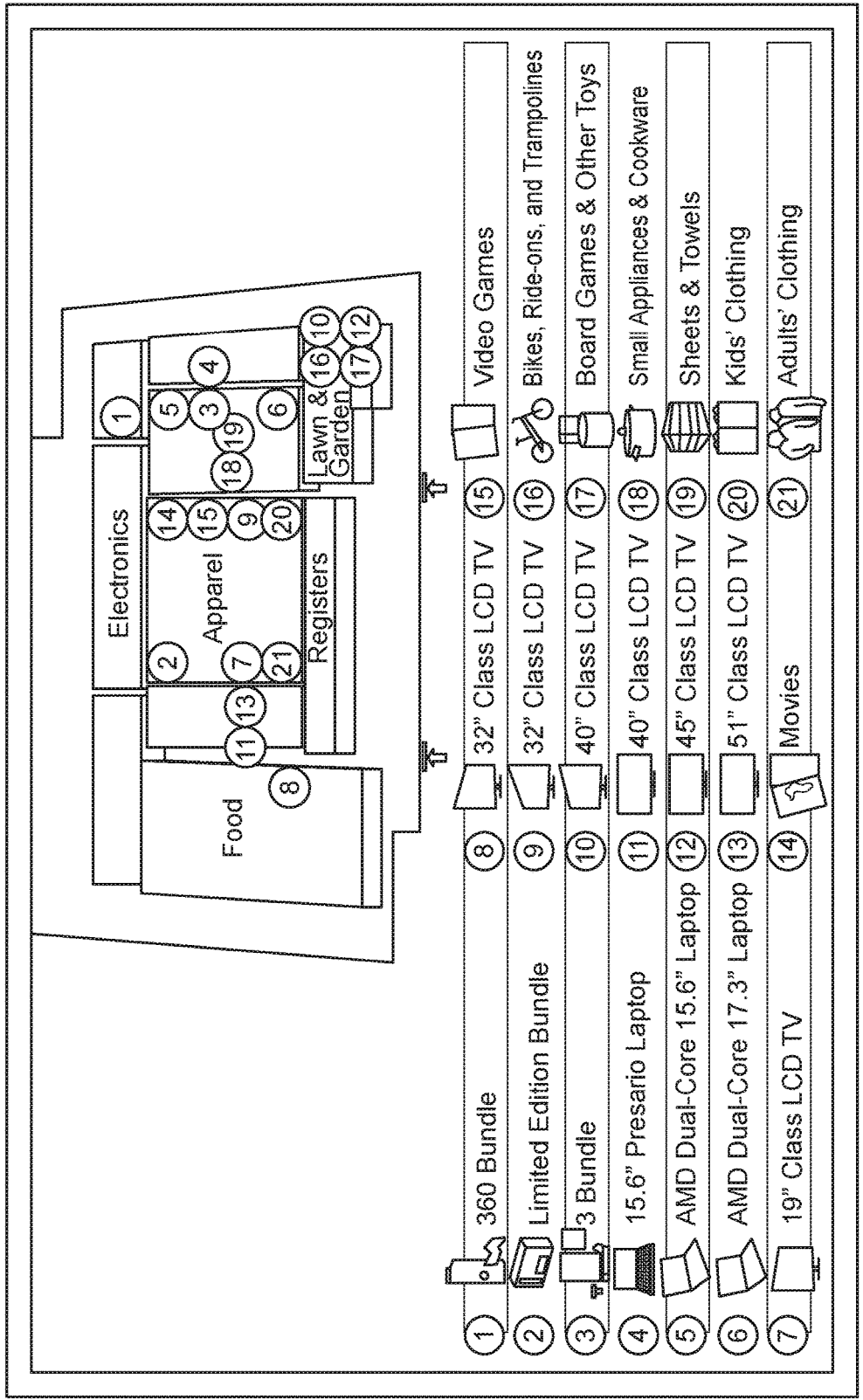
FIG. 6 illustrates another example product map, in one or more embodiments.

FIG. 6 illustrates another example product map 500, in one or more embodiments. The product map 500 is divided into discrete zones (e.g., Food, Apparel, etc.), and illustrates product locations for one or more product categories available within one or more discrete zones.

Figure 7:
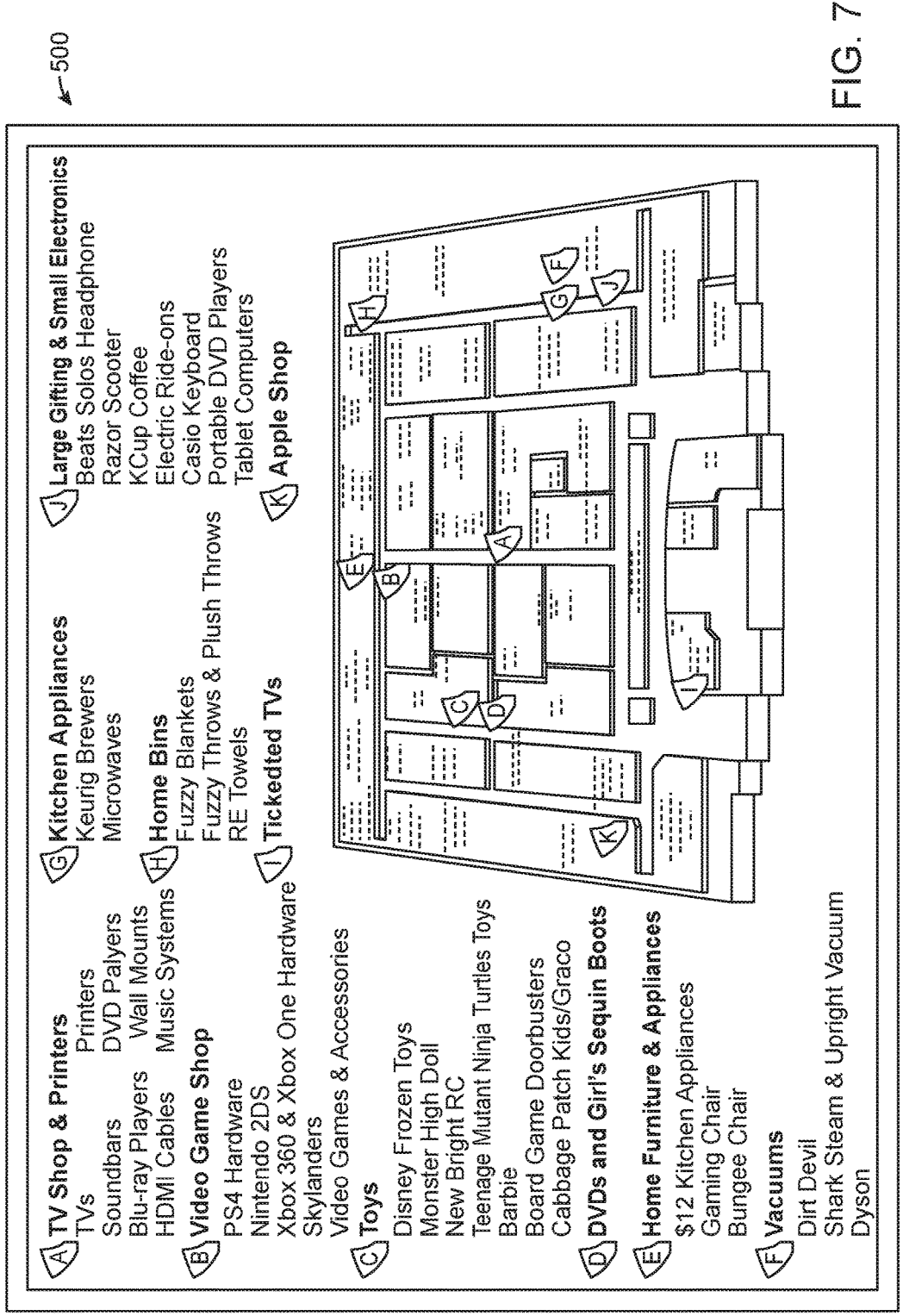
FIG. 7 illustrates another example product map, in one or more embodiments.

FIG. 7 illustrates another example product map 500, in one or more embodiments. The product map 500 is divided into discrete zones (e.g., Video Game Shop, Vacuums, etc.), and illustrates product locations for one or more product categories available within one or more discrete zones.

FIG. 8 illustrates an example fingerprint map 550 for a physical store 100, in one or more embodiments. A device 50 receives a fingerprint map 550 from the system 200. The fingerprint map 550 identifies pre-existing location signatures for a physical store 100. For example, as shown in FIG. 8, the fingerprint map 550 identifies the following WiFi access point signal strengths for different locations within the physical store 100: a first location $Loc_1$ has a WiFi access point signal strength of (X=−20, Y=−50), a second location $Loc_2$ has a WiFi access point signal strength of (X=−40, Y=−70), and a third location $Loc_3$ has a WiFi access point signal strength of (X=−30, Y=−60), wherein X and Y denote WiFi access points. As shown in FIG. 8, an inferred location of the device 50 may be Position A having an observed WiFi signal strength of (X=−41, Y=−73). The device 50 localizes a user 30 carrying the device 50 within the physical store 100 by comparing the observed WiFi signal strength with the fingerprint map.

Figure 9:
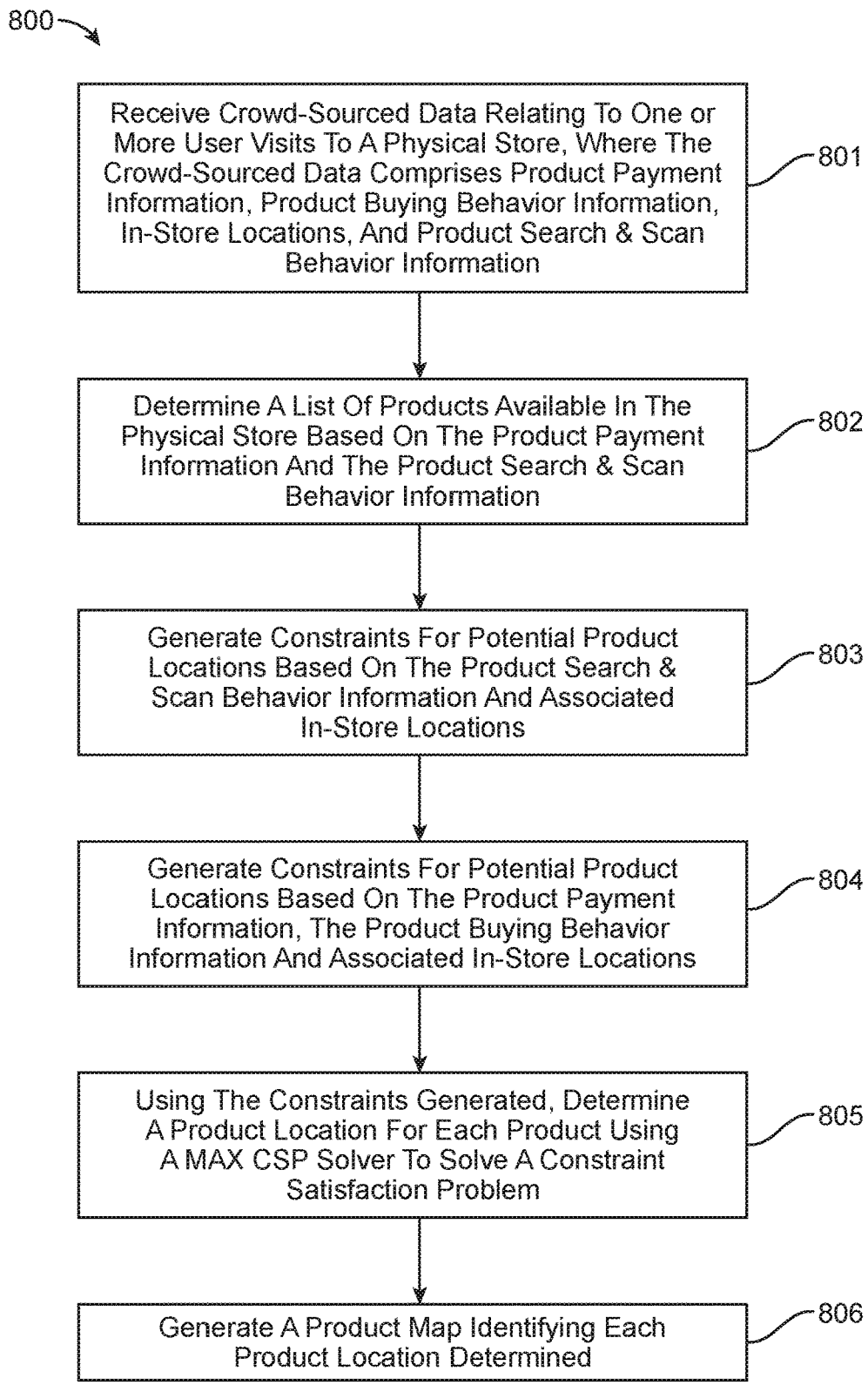
FIG. 9 illustrates a flowchart for an example process for automatic mapping of products available in a physical store, in one or more embodiments.

FIG. 9 illustrates a flowchart for an example process 800 for automatic mapping of products available in a physical store, in one or more embodiments. In process block 801, receive crowd-sourced data relating to one or more user visits to a physical store. The crowd-sourced data comprises product payment information, product search/scan behavior information, in-store locations, and product buying behavior information. In process block 802, determine a list of products available in the physical store based on the product payment information and the product search/scan behavior information. In process block 803, generate constraints for potential product locations based on the product search/scan behavior information and associated in-store locations (i.e., in-store-locations where the product search/scan behaviors were captured). In process block 804, generate constraints for potential product locations based on the product payment information, the product buying behavior information and associated in-store locations (i.e., in-store-locations where the product buying behaviors were captured). In process block 805, using the constraints generated, determine a product location for each product using a MAX CSP solver to solve a constraint satisfaction problem. In process block 806, generate a product map identifying each product location determined. The sequence of steps in process blocks 802, 803 and 804 are interchangeable.

In one embodiment, process blocks 801-806 are performed by the system 200.

Figure 10:
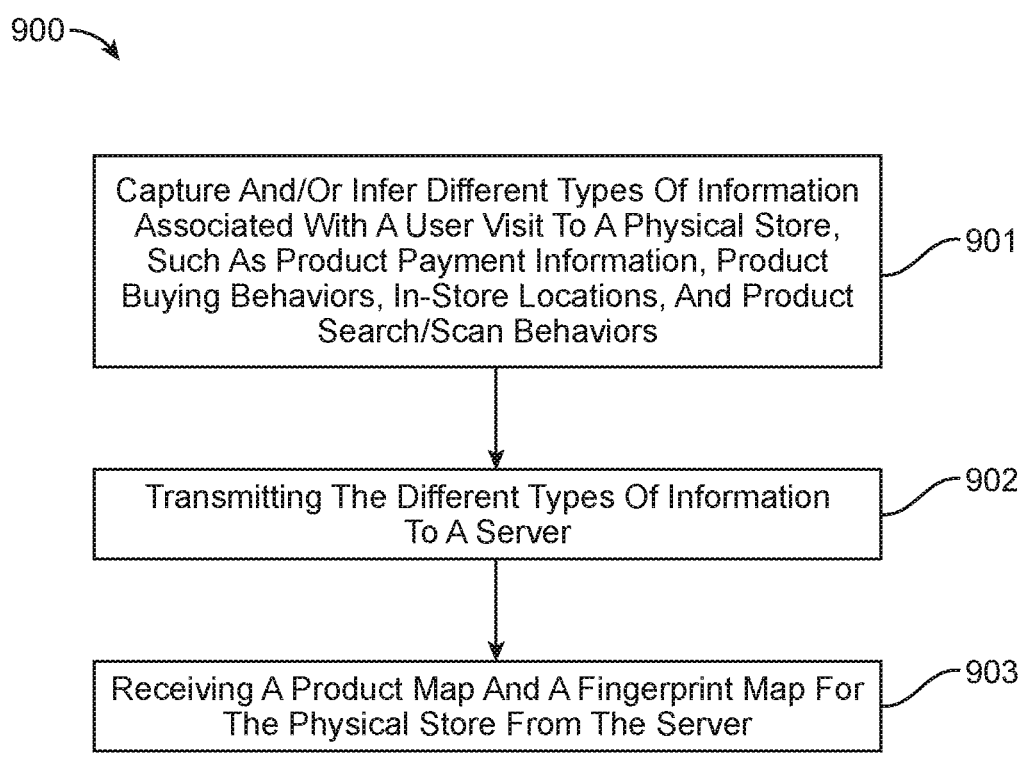
FIG. 10 illustrates a flowchart for an example process for capturing sensor data associated with a visit to a physical store, in one or more embodiments.

FIG. 10 illustrates a flowchart for an example process 900 for capturing sensor data associated with a visit to a physical store, in one or more embodiments. In process block 901, capture and/or infer different types of information associated with a visit to a physical store, such as product payment information, product search/scan behaviors, in-store locations, and product buying behaviors. In process block 902, transmit the different types of information to a server. In process block 903, receive a product map and a fingerprint map for the physical store from the server.

In one embodiment, process blocks 901-903 are performed by a device 50.

Figure 11:
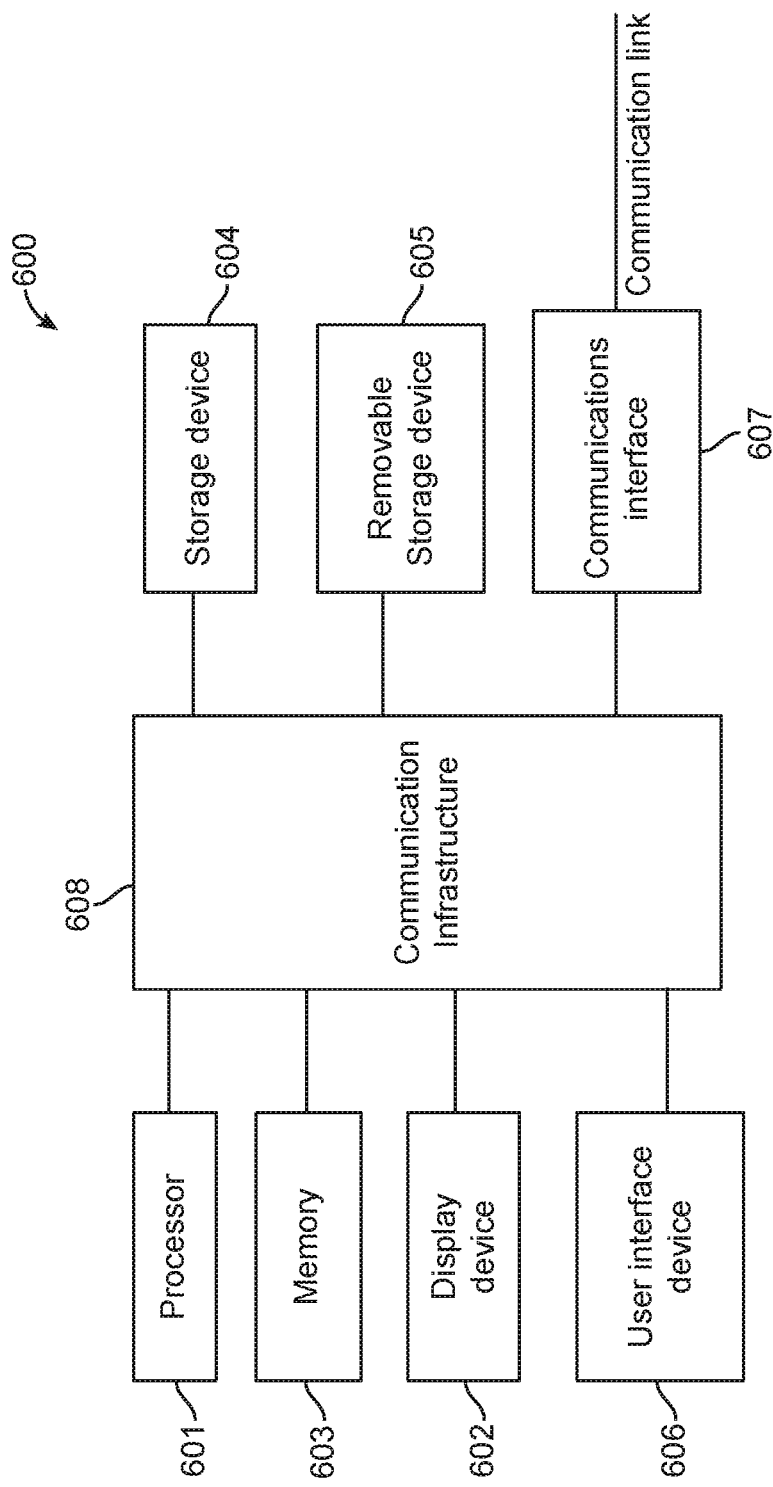
FIG. 11 is an exemplary high-level block diagram showing an information processing system comprising a computer system useful for implementing disclosed embodiments.

FIG. 11 is a high-level block diagram showing an information processing system comprising a computer system 600 useful for implementing the disclosed embodiments. Computer system 600 may be incorporated in a device 50 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for process 800 (FIG. 8) and processing instructions for process 900 (FIG. 9) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
    at a server including at least one hardware processor:
        receiving different types of crowd-sourced information, wherein the different types of crowd-sourced information relate to a physical store that a plurality of electronic devices have visited;
        determining a plurality of products available in the physical store based on the different types of crowd-sourced information;
        correlating the different types of crowd-sourced information to determine at least one product location of at least one product of the plurality of products available, wherein each product location of each product identifies a location of the product within the physical store; and
        providing at least one electronic device with a first map and a second map for the physical store, wherein the first map identifies the at least one product location determined, the second map identifies at least one signal strength for the at least one product location determined, and the first map and the second map facilitate real-time localization of the at least one electronic device in the physical store and improve real-time navigation to one or more products within the physical store.

2. The method of claim 1, wherein the different types of crowd-sourced information comprise:
    product buying behavior information identifying at least one product buying behavior, each product buying behavior captured by an electronic device of the plurality of electronic devices during a visit to the physical store;
    product search and scan behavior information identifying at least one product search or scan behavior, each product search or scan behavior captured by an electronic device of the plurality of electronic devices during a visit to the physical store;
    a plurality of in-store locations, each in-store location identifying a location within the physical store where one of a product buying behavior or a product search or scan behavior is captured by an electronic device of the plurality of electronic devices during a visit to the physical store, and at least one of the plurality of in-store locations is based on noisy location data obtained from pedestrian dead reckoning based on sensor data captured by the plurality of electronic devices; and
    product payment information identifying at least one payment transaction, each payment transaction associated with an electronic device of the plurality of electronic devices during a visit to the physical store.

3. The method of claim 2, wherein correlating the different types of crowd-sourced information comprises:
    generating a set of constraints for at least one potential product location based on the product search and scan behavior information and at least one in-store location of the plurality of in-store locations; and
    for at least one product of the plurality of products available, determining a product location of the product based on the set of constraints.

4. The method of claim 2, wherein correlating the different types of crowd-sourced information comprises:
    generating a set of constraints for at least one potential product location based on the product payment information, the product buying behavior information and at least one in-store location of the plurality of in-store locations; and
    for at least one product of the plurality of products available, determining a product location of the product based on the set of constraints.

5. The method of claim 1, further comprising:
    at the server:
        generating the first map.

6. The method of claim 1, further comprising:
    at the server:
        generating the second map based on the at least one product location determined, wherein the second map comprises at least one location signature for at least one location within the physical store associated with at least one behavior captured by the plurality of electronic devices in relation to the plurality of products available at the physical store, and each location signature is one of a sensor or radio signal strength signature.

7. The method of claim 2, wherein:
    for at least one electronic device of the plurality of electronic devices, the product search and scan behavior information comprises data relating to a visit by the electronic device to the physical store, the data comprising at least one product or product category associated with at least one product search or scan behavior captured by the electronic device during the visit, and at least one timestamp indicating when the at least one product search or scan behavior is captured.

8. The method of claim 2, wherein a product search or scan behavior captured by an electronic device of the plurality of electronic devices during a visit to the physical store comprises using the electronic device to scan one of a product or a barcode for the product, and search for information relating to the product.

9. The method of claim 2, wherein a product search or scan behavior captured by an electronic device of the plurality of electronic devices during a visit to the physical store comprises using the electronic device to perform an online search for information relating to a product available at the physical store.

10. The method of claim 2, wherein:
for at least one electronic device of the plurality of electronic devices, the product buying behavior information comprises data relating to a visit by the electronic device to the physical store, the data comprising at least one timestamp indicating when the electronic device captures at least one product buying behavior, and at least one of height information and orientation information associated with the at least one product buying behavior;
the height information indicating where, on at least one display structure, at least one product associated with the at least one product buying behavior is placed; and
the orientation information indicating, for each of the at least one display structure, a side of an aisle the display structure is located at.

11. The method of claim 2, wherein a product buying behavior captured by an electronic device of the plurality of electronic devices during a visit to the physical store comprises at least one inferred gesture representing a selection of a product at the physical store and placement of the product in a shopping container, and the at least one inferred gesture is based on sensor data captured by at least one sensor device of the electronic device.

12. The method of claim 2, wherein:
for at least one electronic device of the plurality of electronic devices, the product payment information comprises data relating to a payment transaction associated with the electronic device during a visit to the physical store, the data comprising at least one product purchased via the payment transaction, and a timestamp indicating when the payment transaction occurred.

13. A system, comprising:
at least one storage device;
at least one processor; and
a non-transitory processor-readable memory device storing instructions that when executed by the at least one processor causes the at least one processor to perform operations including:
receiving different types of crowd-sourced information, wherein the different types of crowd-sourced information relate to a physical store that a plurality of electronic devices have visited;
determining a plurality of products available in the physical store based on the different types of crowd-sourced information;
correlating the different types of crowd-sourced information to determine at least one product location of at least one product of the plurality of products available, wherein each product location of each product identifies a location of the product within the physical store; and
providing at least one electronic device with a first map and a second map for the physical store, wherein the first map identifies the at least one product location determined, the second map identifies at least one signal strength for the at least one product location determined, and the first map and the second map facilitate real-time localization of the at least one electronic device in the physical store and improve real-time navigation to one or more products within the physical store.

14. The system of claim 13, wherein the different types of crowd-sourced information comprise:
product buying behavior information identifying at least one product buying behavior, each product buying behavior captured by an electronic device of the plurality of electronic devices during a visit to the physical store;
product search and scan behavior information identifying at least one product search or scan behavior, each product search or scan behavior captured by an electronic device of the plurality of electronic devices during a visit to the physical store;
a plurality of in-store locations, each in-store location identifying a location within the physical store where one of a product buying behavior or a product search or scan behavior is captured by an electronic device of the plurality of electronic devices during a visit to the physical store, and at least one of the plurality of in-store locations is based on noisy location data obtained from pedestrian dead reckoning based on sensor data captured by the plurality of electronic devices; and
product payment information identifying at least one payment transaction, each payment transaction associated with an electronic device of the plurality of electronic devices during a visit to the physical store.

15. The system of claim 14, wherein correlating the different types of crowd-sourced information comprises:
generating a set of constraints for at least one potential product location based on at least one of the different types of crowd-sourced information; and
for at least one product of the plurality of products available, determining a product location of the product based on the set of constraints.

16. The system of claim 13, wherein the operations further include:
generating the first map; and
generating the second map based on the at least one product location determined, wherein the second map comprises at least one location signature for at least one location within the physical store associated with at least one behavior captured by the plurality of electronic devices in relation to the plurality of products available at the physical store, and each location signature is one of a sensor or radio signal strength signature.

17. A non-transitory computer readable storage medium including instructions to perform a method comprising:
receiving different types of crowd-sourced information, wherein the different types of crowd-sourced information relate to a physical store that a plurality of electronic devices have visited, and the different types of crowd-sourced information are maintained on at least one storage device;
determining a plurality of products available in the physical store based on the different types of crowd-sourced information;
correlating the different types of crowd-sourced information to determine at least one product location of at least one product of the plurality of products available, wherein each product location of each product identifies a location of the product within the physical store; and
providing at least one electronic device with a first map and a second map for the physical store, wherein the first map identifies the at least one product location determined, the second map identifies at least one signal strength for the at least one product location determined, and the first map and the second map facilitate real-time localization of the at least one electronic device in the physical store and improve real-time navigation to one or more products within the physical store.

18. A method, comprising:
at an electronic device including at least one sensor device:
  capturing different types of information associated with a visit to a physical store;
  transmitting the different types of information to a server, wherein the different types of information are correlated at the server to determine at least one product location of at least one product available at the physical store; and
  receiving a first map and a second map for the physical store from the server, wherein the first map identifies the at least one product location determined, the second map identifies at least one signal strength for the at least one product location determined, and the first map and the second map facilitate real-time localization of the electronic device in the physical store and improve real-time navigation to one or more products within the physical store.

19. The method of claim 18, wherein the different types of information comprise at least one of the following:
  product buying behavior information identifying at least one product buying behavior, each product buying behavior captured by the at least one sensor device during the visit;
  product search and scan behavior information identifying at least one product search or scan behavior, each product search or scan behavior captured by the at least one sensor device during the visit; and
  a plurality of in-store locations, each in-store location identifying a location within the physical store where one of a product buying behavior or a product search or scan behavior is captured by the at least one sensor device during the visit, and at least one the plurality of in-store locations is based on noisy location data obtained from pedestrian dead reckoning based on sensor data captured by the electronic device.

20. The method of claim 18, further comprising:
at the electronic device:
  determining a real-time location of the electronic device in the physical store based on the second map; and
  providing navigation to a desired product in the physical store based on the real-time location and the first map;
  wherein the second map comprises at least one location signature for at least one location within the physical store associated with at least one behavior captured by the electronic device in relation to the at least one product available at the physical store, and each location signature is one of a sensor or radio signal strength signature.

* * * * *